United States Patent [19]

Metcalf

[11] E Re. 28,687

[45] Reissued Jan. 20, 1976

[54] WIRE STRIPPER

[75] Inventor: Irving R. Metcalf, St. Charles, Ill.

[73] Assignee: Ideal Industries, Inc., Sycamore, Ill.

[22] Filed: Jan. 26, 1972

[21] Appl. No.: 326,819

Related U.S. Patent Documents

Reissue of:

[64] Patent No.: 3,564,951
Issued: Feb. 23, 1971
Appl. No.: 712,682
Filed: Mar. 13, 1968

[52] U.S. Cl. ..... 81/9.5 A
[51] Int. Cl. ..... H02g 1/12
[58] Field of Search..... 81/9.5 A, 9.5 R, 417, 416, 81/427; 30/267

[56] References Cited

UNITED STATES PATENTS

| | | | |
|---|---|---|---|
| 2,449,839 | 9/1948 | Brittle | 30/363 X |
| 2,735,492 | 2/1956 | Cain | 30/363 |
| 2,889,728 | 6/1959 | Hindenberg | 81/9.5 A |
| 3,128,652 | 4/1964 | Schinske | 81/9.5 A |

FOREIGN PATENTS OR APPLICATIONS

| | | | |
|---|---|---|---|
| 459,908 | 9/1949 | Canada | 30/363 |

*Primary Examiner*—Othell M. Simpson
*Assistant Examiner*—Roscoe V. Parker
*Attorney, Agent, or Firm*—Kinzer, Plyer, Dorn & McEachran

[57] ABSTRACT

A wire stripper capable of being made of stamped parts and of reduced size with a device to prevent fraying or nicking wires. The wire stripper may be manually operated, in the form of a hand-held unit, and uses a phantom center actuating arrangement with a single spring arrangement for blade opening and handle return.

24 Claims, 17 Drawing Figures

WIRE STRIPPER

Matter enclosed in heavy brackets [ ] appears in the original patent but forms no part of this reissue specification; matter printed in italics indicates the additions made by reissue.

SUMMARY OF THE INVENTION

This invention is in the field of wire strippers and specifically relates to a manually operated hand wire stripper, although certain features can be used in other types of strippers, for example bench strippers, automatic strippers or power strippers.

A primary object of the invention is a wire stripper which can be made from stamped parts thereby achieving ruggedness and avoiding the expense of die cast parts.

Another object is a hand stripper which can have the same size and general appearance as a die cast stripper but avoids its brittleness.

Another object is a handle actuating arrangement for a hand stripper using a phantom center or fulcrum for the handles to reduce width.

Another object is a friction or latching arrangement which causes the blades and grippers to release the wire prior to the closing of the jaws so that the wire, be it solid or stranded, will not be frayed or damaged by the return of the parts to initial position while they are in contact with the wire.

Another object is a friction arrangement of the above type which will operate in any pivoted position without requiring that handle excursion be completed.

Another object is an improved return spring arrangement for a hand stripper.

Another object is a spring arrangement for a stripper which lets one spring do the work of two.

Another object is a frame construction for a stripper which avoids binding of the sliding grippers or blades.

Another object is a return spring arrangement on a stripper which automatically takes care of the variable distance created by opening and closing the handles.

Another object is a frame construction for a wire stripper which automatically defines a true plane for the sliding grippers or blades.

Another object is an actuating connection between the handles, grippers and blades in a wire stripper which insures straight line motion and avoids camming or cocking of the grippers and blades.

Another object is a manually operated wire stripper in which the upper grippers or blades are fixed and the lower grippers or blades are movable, thereby avoiding manufacturing problems, and resulting in reduced cost.

Another object is a blade and gripper moving arrangement for a wire stripper which eliminates unfavorable stresses.

Another object is a stripper that provides uniform closing regardless of wire size.

Another object is a friction type latching arrangement in a wire stripper which does not have a snap action.

Other objects will appear from time to time in the ensuing specification and drawings.

DESCRIPTION OF THE PREFERRED EMBODIMENTS

Figure 1:
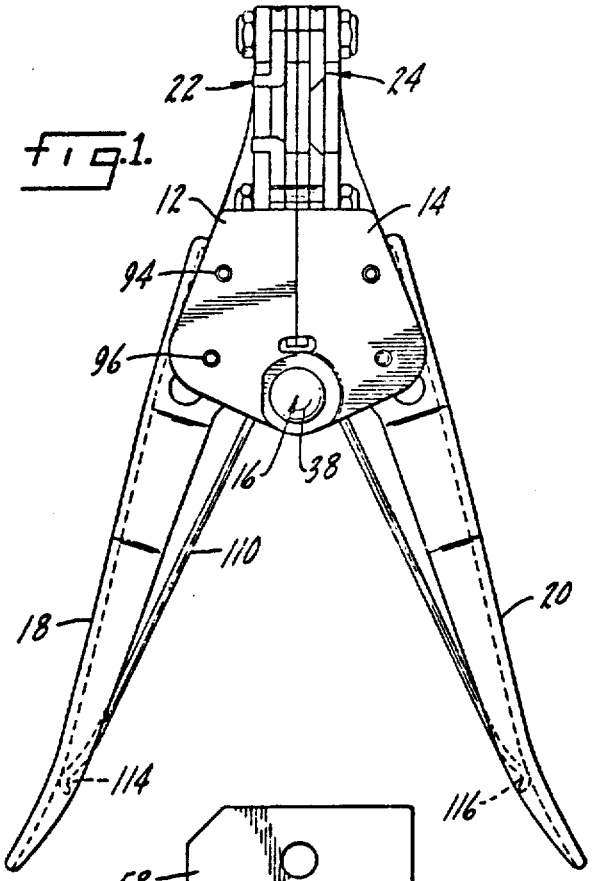
FIG. 1 is a plan view of this stripper.
Figure 14:
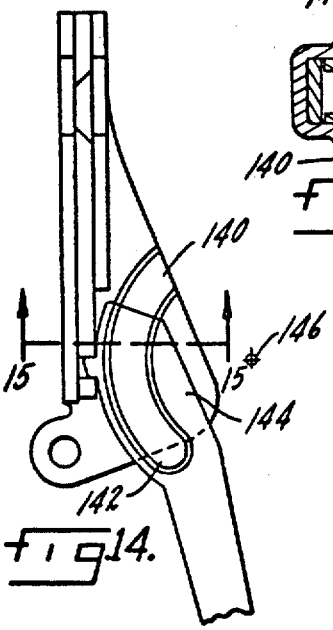
FIG. 14 is an additional modification.
Figure 15:
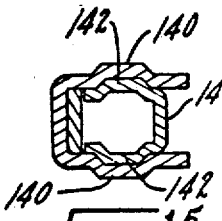
FIG. 15 is a section along line 15—15 of FIG. 14.

The stripper is shown as including two frames or jaws or levers, 12 on the left in FIGS. 1 and 14 on the right, pivoted together generally at 16. A pair of handles, 18 on the left and 20 on the right, extend down from the levers and are adapted to be manually manipulated to pivot the levers in an opening and closing action about the pivot 16. The levers themselves carry pairs of paired clamping or gripping and stripping blades, the clamping or gripping blades being designated generally at 22 on the left lever and the stripping blades being designated generally 24 on the right lever. Each of the pairs of blades is adapted to perform an opening and closing action. The upper blades of each pair is shown as fixed and the lower blade moves upward to coact.

Figure 3:
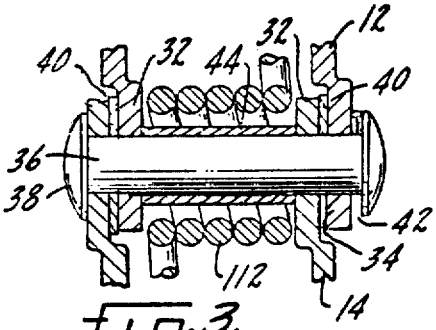
FIG. 3 is a section along line 3—3 of FIG. 2, on an enlarged scale.

The levers 12 and 14 may be stamped parts and are preferably identical, except that they are mirror images, so that they can be made with one set of stamping dies. One such lever has been shown in detail in FIGS. 7 through 9 which may be considered to show either lever. The lever or frame is generally a channel or U-shaped, as shown in FIG. 9, with a web or plate 26 and side legs or flanges 28 and 30 extending down to bosses 32 and 34, each of which has a hole to accept a pivot pin 36 in FIG. 3, which may be headed on each end as at 38 or otherwise formed to provide a unitary structure. The bosses 32 and 34 are offset to one side, as shown in FIGS. 3 and 9, so that the left and right levers may interfit. Between the offset bearing portions, friction washers 40 may be positioned, and an axial thrust or compression is acquired by one or more Belleville springs or cone washers 42 so that a frictional drag or resistance is acquired between the moving or pivoted levers, shown in this case as applied directly at the pivot, although it might be otherwise. A spacing sleeve 44 may be used around the pivot pin or rivet to prevent the bosses from flexing inwardly, thus assuring that the Belleville washers are effective.

Figure 6:
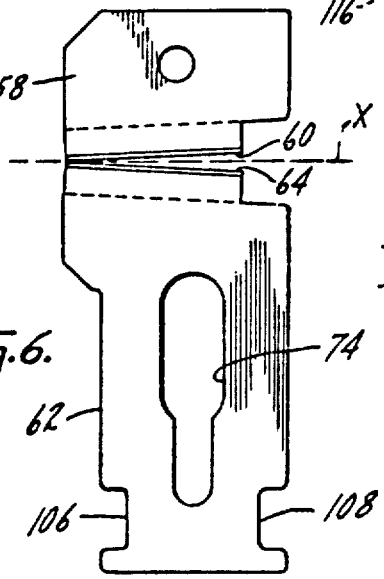
FIG. 6 is an enlarged side view of one of the blades or jaws.
Figure 7:
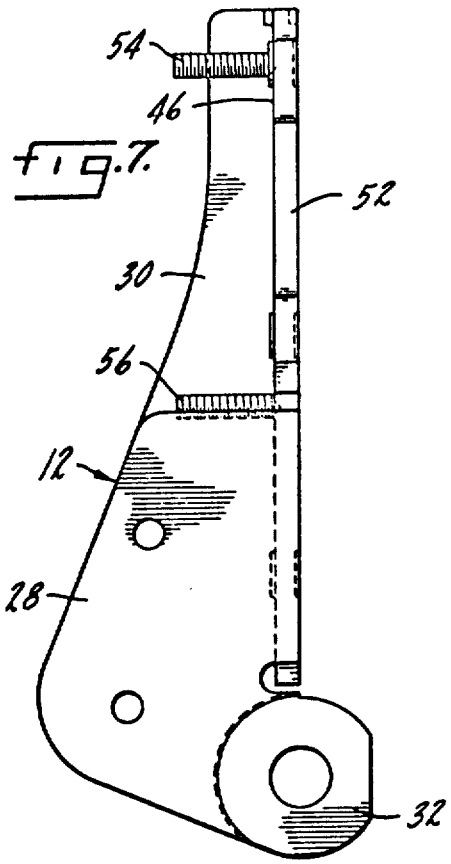
FIG. 7 is an enlarged front view of one of the frames.
Figure 8:
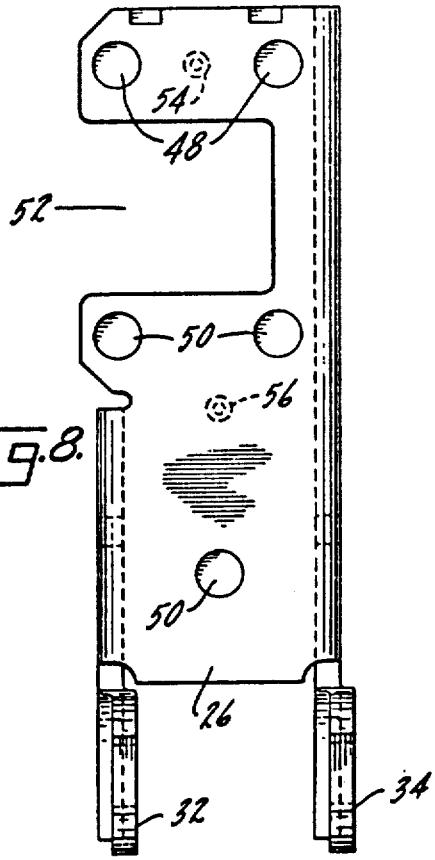
FIG. 8 is a side view of FIG. 7.
Figure 9:
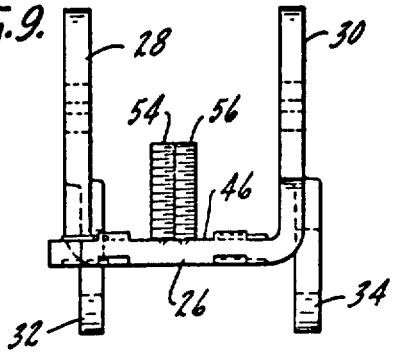
FIG. 9 is a top view of FIG. 8.
Figure 10:
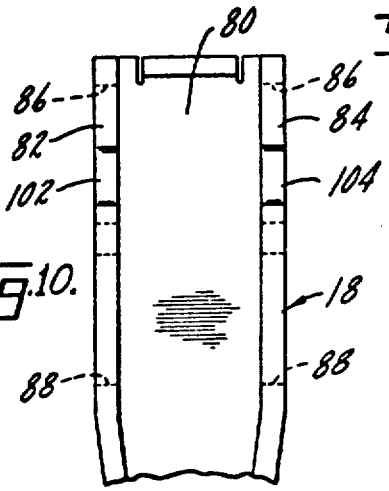
FIG. 10 is a side view of the upper part of one of the levers.

As shown in FIGS. 7 through 9, a plurality of projections are formed on what may be considered the inner surface 46 of the web or plate 26. For example, two such projections 48 are formed in the upper portion thereof and three, as at 50, in the lower portion, the upper and lower portions being generally separated by a side slot 52. Studs or screws 54 and 56, welded or otherwise suitably connected to the inner surface 46, also hold and guide the blades and grippers. Referring o FIG. 4, the holding arrangement for only one set of blades is explained in detail since the other one may be dentical. The upper clamping blade or gripper 58 is omewhat L-shaped in cross section with its lower surace 60 being serrated or otherwise formed to provide gripping action when the lower blade 62 comes up vith its gripping face 64. Note the closed position in IG. 5. The upper stud 54 extends through a backing or uide plate 66 which is held by a stop nut 68 or the like. he lower stud or screw 56 extends through a spacer 0, through the lower portion of backing plate 66 and held in place by a stop nut 72 or the like. The movble blade 62 moves up and down around the spacer 70 ehind the guide plate 66 with the stud and spacer 70 itting in a slot 74, in FIG. 6 in the blade. While the lade or gripper shown in FIG. 6 is actually the gripping lade, the arrangement is the same for the cutting lade. Since the slot 74 is elongated in a vertical direcion, this allows for the vertical travel of the lower lades. Note that the inner surface of the lower blade vill abut the three projections 50 on the inner surface f the lever. Thus the blade, in moving up and down, noves in a true plane defined by these three projecions. The spacer 70 is such that there is no binding, nd movement of the blade up and down is free and asy. The upper blade or gripper 58 is firmly clamped gainst the upper two projections 48.

It is preferred that the two blades be made out of the ame stock, so the thickness of the plates from which hey are made can be the same. To prevent any drag or inding of the lower blade, the upper projections 48 xtend out a little bit more than the lower projections 0 which create a slight spacing for free movement of he lower blade.

Figure 2:
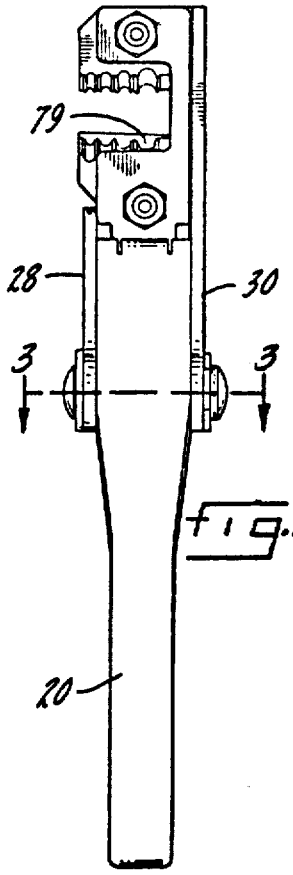
FIG. 2 is a side view of FIG. 1.

The mounting and movement of the cutting blades 76 nd 78, each of which has teeth or cutting channels on he opposed surfaces, may be the same as the clamping lades or grippers. The upper gripping surface 64 of the ripping blade may be on a slight angle to the horizonal, indicated by line X. The same is true of the gripping urface 60 on the upper jaw. Thus the two surfaces iverge somewhat in a lateral direction and this diverence conforms to the various hole sizes 79 in the cuting blades, the largest on the right in FIG. 2 and the mallest on the left. The smaller the wire, the closer a articular opening 79 allows the jaws to approach. The ivergence of the gripping surfaces compensates for his, resulting in a more or less true centering of the vire, regardless of wire size.

The handles 18 and 20 may be the same so the details f only one will be explained. The handle may be a tamped part, generally U-shaped in cross section, pening inwardly with a web 80 and side legs 82 and 4. Each side part or leg has arcuate channels 86 and 8, each of which fits around a guide or roller 90 and 2 mounted on pins which extend into the levers, as hown at 94 and 96 in FIG. 1. The channels 86 and 88 re swung more or less on the same arc, for example oughly about a center 98 shown in FIG. 4, exterior to he stripper. Handle 18 may be considered to be pivted about the point 98, and in that sense it moves bout a phantom center with the limits of travel being letermined by the ends of the slots. The lower end of he upper slot 86 is provided with an offset 100 to aid n assembly and disassembly.

The legs 82 and 84 each has an inwardly extending projection 102 and 104 which extend into slots 106 and 108 formed in the sides of the movable blade and gripper, as shown in FIG. 6. The result is that as the handles are closed, from the FIG. 4 to the FIG. 5 position, the upper portion of the handle will move about the rollers 90 and 92 which causes the projections 102 and 104 to raise the lower slidable blade and gripper. A return spring 110 is coiled about the center rivet, as at 112, with the ends thereof extending down each handle and terminating at 114 and 116, each of which freely slides along the inner surface of the handles. Thus as the handles are closed, the ends 114 and 116 will slide down the inner surface toward the end of the handle, and as they are opened, the loops will slide back up.

Figure 11:
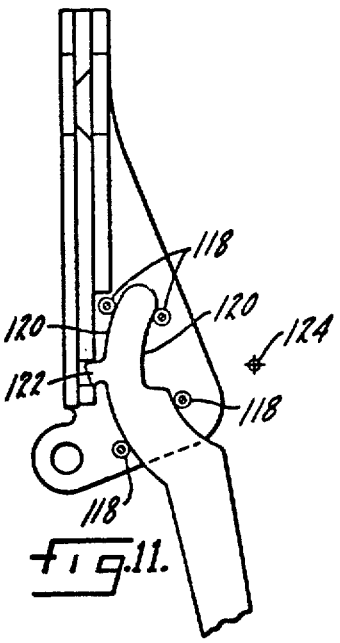
FIG. 11 is a partial side view, similar to FIG. 4, of an alternate form.
Figure 12:
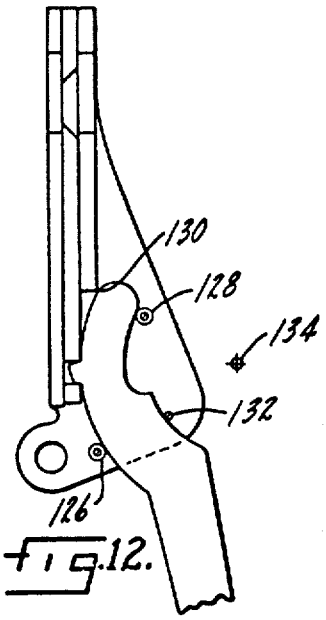
FIG. 12 is like FIG. 11, but of a further alternate.
Figure 13:
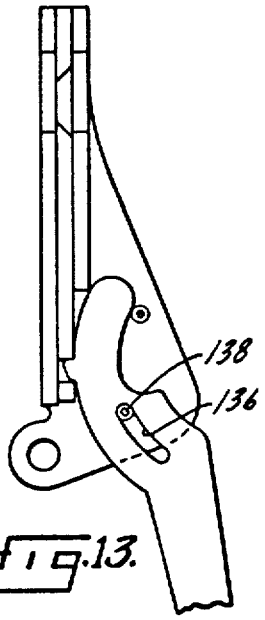
FIG. 13 is a further variation.

The phantom center or fulcrum arrangement explained in connection with the arcuate slots and pins in FIGS. 4 and 5 may be varied somewhat. For example, a plurality of guide pins, shown as four at 118 in FIG. 11, bear against arcuate surfaces 120 on the upper portion of a modified handle, the upper portion having projections 122 which extend into the notches in the lower portion of the slidable blade. The disposition and arrangement of the guide pins and arcuate surfaces is such that movement will be effected more or less about a center point, designated generally 124, exterior to the stripper. All of the pins in FIG. 11 have free rollers or rolls about them, whereas in the form of FIG. 12, only two such pins and rollers are used, as at 126 and 128, with the upper inner arcuate surface of the handle bearing against a part of the guide plate, as at 130. The lower arcuate surface bears against a simple pin 132. As before, the dimensioning and spacing is such that a generally arcuate movement is acquired generally about a center located more or less at 134. In FIG. 13 a variant form is shown in which instead of lower pins and rollers around the lower end of the arcuate surfaces of the handles, a center slot and pin 136 and 138 with a roller is used to effect movement about a point exterior to the frame of the stripper.

In FIG. 14 the sides of the frame are formed outwardly somewhat, at 140, to provide inner channels into which corresponding formations 142 fit which are provided in the sides of the upper part 144 of the handle. The surfaces and channels are generally arcuately disposed so that arcuate movement is more or less provided about an exterior center 146.

Figure 16:
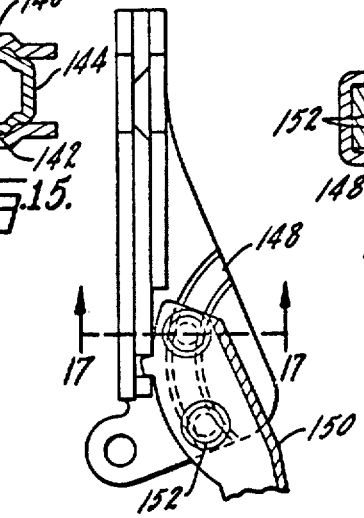
FIG. 16 is a further variant.
Figure 17:
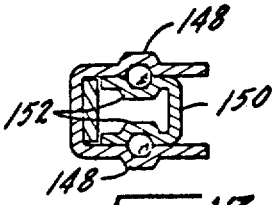
FIG. 17 is a section along line 17—17 of FIG. 16.

In FIGS. 16 and 17 similar exterior formations 148 are provided at the sides of the levers or frames, but the upper portion of the handle 150 is oppositely formed at each side, as at 152, so that in effect arcuately disposed ball races are provided. The oppositely disposed formations 152 are localized and are in the form of separated dimples, as shown in FIG. 16, so that the ball in each dimple will stay in place, but free movement is provided along the continuous channel 148. The disposition, dimensioning and arrangement is such that a generally arcuate movement is provided about a center exterior to the frame of the stripper.

The use, operation and function of the invention are as follows:

One of the main advantages of this stripper is that it may be made entirely of stamped parts and, therefore, is very rugged and will take a great deal of punishment. At the same time, it may be very precise in its operation and can be used as a precision unit. Also, a compact, small, over-all arrangement is provided which prevents it from being large, bulky and unwieldy, which would be detrimental in a hand stripper. The unit may be operated basically like other hand strippers, namely the handles are squeezed together by the operator which causes the blades and grippers to close, the gripping jaws or grippers grabbing the insulation and the cutting jaws or blades cutting through.

As the handles are squeezed together, the lower blades or jaws rise so that they, first, grip and cut the insulation and, second, the levers spread when the bottom of the slots arrive at the rollers 90 and 92. This first phase of movement is from FIG. 4 to FIG. 5. *This closing movement of the handles from FIG. 4 to FIG. 5 compresses the spring 110 somewhat but the levers stay in their closed position due to the resistance offered to such movement by the resistance of the retard mechanism which includes the Belleville washer 42 and friction disc arrangement 40 of FIG. 3.* Thereafter, continued closing of the handles will *overcome the resistance of the retard mechanism and* cause the levers to separate, which strips the insulation from the wire. This might be considered the second stage of movement. During both stages, the return spring 110 is compressed and tends to resist this movement. This brings the levers or handles to their fully closed position. Thereafter the operator relaxes and allows the return spring 110 to separate the handles.

The friction arrangement, which may be considered in the nature of a latch, shown in detail in FIG. 3, initially resists closing movement of the levers. Thus the levers stay spread and the initial opening movement of the handles lowers the cutting and stripping blades. This frees the wire and the operator can remove it before the levers come together. When the top of the slots 86 and 88 arrive at and contact the rollers 90 and 92, the force of the spring 110 will cause the levers 12 and 14 to close. So a two stage return movement is provided, the first opening the grippers and blades and the second closing the levers. Note that one spring controls this action and the frictional resistance caused by the Belleville washer and frictional disc arrangement of FIG. 3 causes the grippers and blades to open first and the levers to close second. Thus the stripped wire can be removed and no fraying of stranded wire or scoring or nicking of solid wire will result.

A similar type of release arrangement has previously been incorporated in commercial strippers but it involved a latch which, once the latch was knocked loose, allowed the levers to snap together, which was somewhat violent and could and did cause damage. In the present arrangement, the frictional resistance merely allows the spring to slowly and uniformly close the levers after the grippers and blades have been fully separated. There is no snap action. Further, the prior latch was only effective when the levers had been separated to one distinct point, which meant one complete handle closure. In the present arrangement, the release will function regardless of the amount of separation of the levers, be it a full separation or any partial separation. This has the advantage that the operator can close the handles any desired amount and he knows that the grippers and blades will open first during return movement so that he can remove the wire and prevent it from being damaged.

Figure 4:
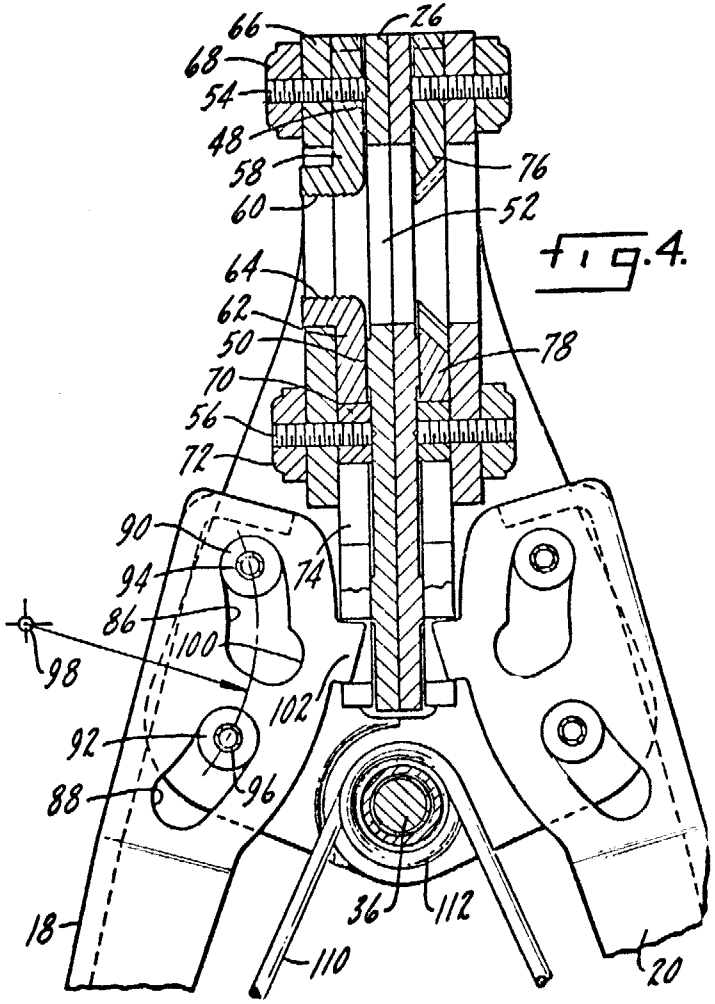
FIG. 4 is a lateral section through the upper portion of the stripper of FIGS. 1 and 2, on an enlarged scale.
Figure 5:
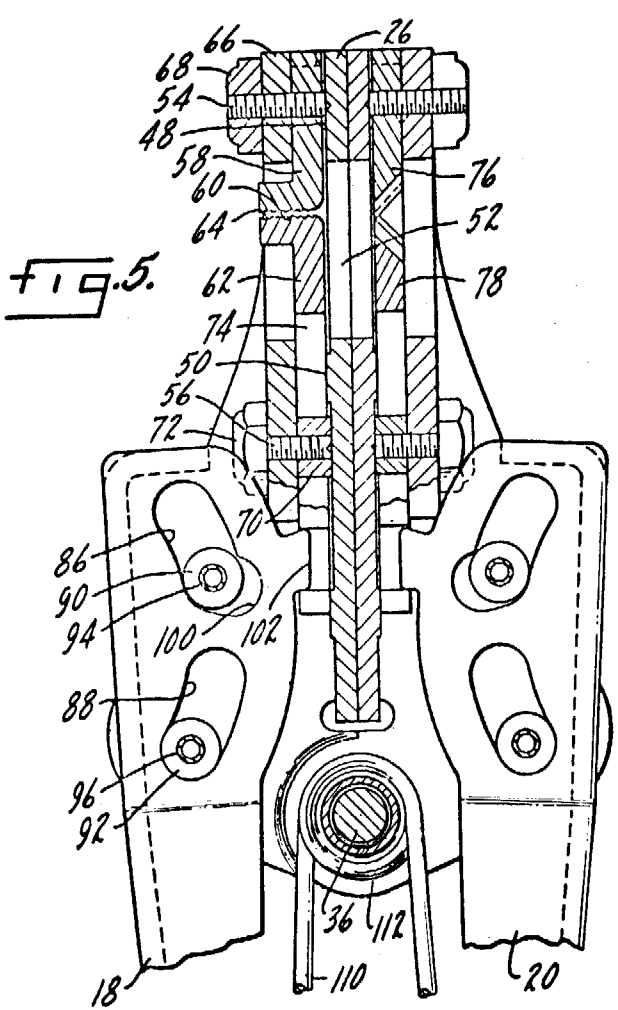
FIG. 5 is similar to FIG. 4 but shows a different operating position.

The phantom center or fulcrum arrangement substantially reduces the size of the unit as compared to one that might have pivots on the outside, for example at point 98 in FIG. 4. This substantially reduces the weight of the over-all unit, and gives it a true pivoting action or something like it.

Another advantage is the single spring arrangement. In prior strippers where a coil spring has been disposed between the handles, extending across in the form of an arch, as the handles are closed and the coil spring tends to go solid, a strut effect takes place so that thereafter the force being applied tends to open the upper levels instead of forcing the jaws together. In the present construction, the spring force is applied to the handles down at the bottom or toward the outer ends of the handles, as at 114 and 116 in FIG. 1. The force of closing the handles will be someplace between the points 114 and 116 and the pivot 16. Thus if any strut effect occurs, the application of pressure by the hand of the operator will be above it. More of the total force will be going into closing the blades and grippers rather than spreading the upper levers 12 and 14. The force required to grip and cut the insulation will be more directly applied and will be more effective.

Further, the lower gripper and blade move up instead of the uppers moving down. Prior arrangements in which the uppers moved required complex linkage arrangement to connect the handle to the uppers. The present connection is quite simple in that the inwardly extending projections on the inner part of the handles connect directly into notches 106 and 108 in the lower portion of the gripper and blade. Thus the process of grinding the movable blade is greatly simplified since its cutting surface will not be encumbered by a linkage or tail arrangement.

Further, the force of the closing handles is applied on each side of the lower gripper and blade, in notches 106 and 108, rather than in the center. This has the advantage that the blade will not have any tendency to cant or cock as it moves up and no frictional drag or resistance will be encountered. If a center slot were used, the two sides of the handles would have to be brought together into a center projection, which is undersirable and cumbersome. Using two projections and a slot on each side of the blade insures a parallel motion instead of a canting or cocking motion.

In prior forms where the upper blade and gripper moved down in the case of a difficult or tough strip, it tended to strip the holding screw. But by moving the lower blade and gripper up, there will be very little tendency, if any, to break off one of the welded studs.

Having the lower ends of the springs, as at 114 and 116, riding up and down freely inside of the channel shaped handles has the advantage that as the handles are closed, the point of spring application will change and the free sliding effect avoids the complications of rigidly connecting one to the other. The difficulty, which is avoided, is that as the handles are closed, the distance will be shortened. But the sliding arrangement completely solves this.

The dimpling arrangement in the frames has the advantage that a true plane can be defined in which the movable blade and gripper moves since three points define a true plane. Further the upper dimples, which bear against the fixed blade, can be easily made to project slightly farther than the lower ones so that when the entire assembly is clamped together, a slight clearance will be provided for the lower blade and gripper and, since it has to move, this avoids any binding or frictional dragging.

An advantage of the phantom center or fulcrum arrangement is that it substantially reduces the over-all ize of the unit. The offsets or notches, designated 100 n the sliding connection between the levers and handles, greatly facilitate disassembly and replacement of vorn out or broken blades. In the position of the various parts in FIG. 5, the handles 18 and 20 can be compressed together further. The upper portions of the handles will pivot outwardly about the lower pins 96 and the upper rollers 90 will enter the offsets or notches 100. This additional movement allows the projections 102 to come out of the notches or slots 106 and 108 in the bottom of the lower sliding jaws. With the nut 72 removed, the lower jaw can be lifted out and replaced. Thus, blade replacement can be very simply done and does not require substantial disassembly of any major components or parts of the stripper.

Whereas the preferred form and several variations of the invention have been shown and suggested, it should be understood that suitable additional modifications, changes, substitutions and alterations may be made without departing from the invention's fundamental theme.

I claim:

1. In a stripper mechanism, a pair of pivoted levers, handles on the levers constructed to perform a closing and opening action effective to open and close the levers, pairs of clamping and stripping members on the levers effective to grasp and strip insulation from wire positioned between them, and a friction retard mechanism effective to releasably hold the levers apart in pivoted position while the paired members separate allowing a wire to be removed prior to closing of the levers.

2. In a stripper mechanism, a pair of pivoted levers, handles mounted on the levers and constructed to perform a closing and opening action effective to open and close the levers, pairs of clamping and stripping members on the levers operated by manipulation of the handles effective to grasp and strip insulation from wire positioned between them, and a connection between the handles and levers effective, upon manipulation of the handles, to move the handles through a generally arcuate path described generally about a center laterally outside of the levers.

3. The structure of claim 2 further characterized in that the connection is in the form of pins and generally arcuate slots between the handles and levers.

4. The structure of claim 2 further characterized in that the connection between the handles and levers is in the form of an arcuate formation on one and a guiding follower on the other conforming thereto.

5. In a stripper mechanism, a pair of pivoted levers, handles constructed to perform a closing and opening action effective to open and close the levers, pairs of clamping and stripping members on the levers operated by manipulation of the handles effective to grasp and strip insulation from wire positioned between them, and a return spring effective on the handles at a point adjacent the ends thereof tending to bias the handles apart such that the application of manual force to the handles will be generally between the lever pivot and the effective point of the return spring on the handles, *and a resistance device on the levers providing a greater resistance to pivoting motion of the levers than the resistance of the return spring so that the clamping and stripping members close before the levers open.*

6. The structure of claim 5 further characterized in that the return spring is coiled around the lever pivot with each end thereof extending along one of the handles in contact therewith at a point adjacent the end.

7. The structure of claim 6 further characterized in that each end of the return spring contacts the inner surface of its handle in a free sliding contact.

8. In a stripper mechanism, a pair of pivoted levers, handles slidably mounted on the levers and constructed to perform a closing and opening action effective to open and close the levers, pairs of clamping and stripping members on the levers operated by manipulation of the lever handles effective to grasp and strip insulation from wire positioned between them, the upper such members being fixed and the lower being slidably mounted on the levers, and a connection between the lower end of the sliding lower members and inside of the handles effective to raise the lower members when the handles are closed.

9. The structure of claim 8 further characterized in that the connection takes the form of two inwardly extending projections fitting in slots in the sides of the lower members.

10. In a stripper mechanism, a pair of frames, operable means effective to open and close the frames, pairs of clamping and stripping members on the frames operated by the operable means effective to grasp and strip insulation from wire positioned between them, at least one such member of each pair being slidably mounted on its frame, and three spaced projections extending from the surface of the frame engaging the slidable member and serving as the sliding support therefor.

11. In a stripper mechanism, a pair of frames, operable means effective to open and close the frames, pairs of clamping and stripping members on the frames operated by the operable means effective to grasp and strip insulation from wire positioned between them, one member of each pair being slidably mounted on its frame and the other being fixed, and a plurality of projections extending from the surface of the frame engaging the members, the projections engaging the fixed member extending slightly farther from the frame surface than those engaging the slidable member to prevent binding thereof.

12. In a stripper mechanism, a frame supporting pairs of clamping and stripping members effective to grasp and strip insulation from wires positioned between them, means for causing them to perform a clamping and stripping action, a plurality of cutting openings in the stripping members to cut insulation around the wire, the openings being graduated in size from largest to smallest, and gripping faces on the gripping members diverging somewhat in the direction of the largest cutting opening.

13. In a stripper mechanism, a pair of pivoted levers, handles mounted on the levers and constructed to perform a closing and opening action effective to open and close the levers, pairs of clamping and stripping members on the levers operated by manipulation of the lever handles effective to grasp and strip insulation from wire positioned between them, the upper such members being fixed and the lower being slidably mounted on the levers with a connection between the lower end of the sliding lower members and the inside of the handles taking the form of two inwardly extending projections fitting into slots in the side of the lower members, a connection between the handles and levers in the form of pins and generally arcuate slots between the handles and the levers, and generally inward extensions of the arcuate slots permitting said projections to disengage the slots in the sides of the lower members, thereby enabling removal of said sliding lower members.

14. In a hand stripper, a pair of pivoted levers, handles mounted on the levers and constructed to perform a closing and opening action effective to open and close the levers, pairs of clamping andstripping jaws on the levers effective to grasp and strip insulation from wire positioned between them, and a resistance formation effective between the levers including a friction disk and Belleville spring arrangement on the lever pivot effective to hold the levers apart, by friction, until the clamping and stripping jaws have been separated allowing the wires to be removed after stripping prior to the closing of the levers.

15. The structure of claim 14 further characterized by and including a spring arrangement biasing the handles apart at all times.

16. The structure of claim 8 further characterized in that the slidable mounting between the handles and levers is constructed to move the handles through a generally arcuate path described generally about a center laterally outside of the levers.

17. In a hand stripper, a pair of pivoted levers, pairs of clamping and stripping jaws on the levers, the upper jaw of each pair being fixed on a lever and the lower jaw being movable to perform a generally linear opening and closing action with the fixed jaw, handles on the levers, a sliding generally arcuate mounting between the handles and levers constructed such that manual closing of the handles causes them to move inwardly and upwardly relative to the levers, and connections between the movable lower jaws and the handles such that manual closing of the handles is effective to raise the lower jaws to thereby grasp and strip insulation from wires positioned between the jaws.

18. The structure of claim 17 further characterized in that the mounting between the handles and levers is constructed to move the handles through a generally arcuate path described generally about a center laterally outside of the levers.

19. In a hand stripper, a pair of pivoted levers, pairs of clamping and stripping jaws on the levers, the upper jaw of each pair being fixed on a lever and the lower jaw being movable, the jaws being constructed to grasp and strip insulation from wire positioned between them, handles on the levers constructed to perform a closing and opening action, a connnection between the slidable lower jaws and the inside of the handles including at least one inwardly extending projection on each handle fitting in the lower jaw, a sliding connection between the handles and levers constructed such that manual closing of the handles causes them to move inwardly and upwardly relative to the levers to thereby raise the lower jaws, and an offset in the sliding connection permitting the projections to be disengaged from the lower jaws thereby enabling removal and replacement of the lower jaws.

20. The structure of claim 19 further characterized in that the sliding connection between the handles and levers includes a plurality of pin and slot connections constructed, upon manipulation of the handles, to move the handles through a generally arcuate path described generally about a center laterally outside of the levers.

21. In a hand stripper mechanism, a pair of pivoted levers, handles on the levers constructed to be manually closed and opened effective to pivot the levers open and closed, pairs of clamping and stripping jaws on the levers effective to grasp and strip insulation from wire positioned between them, and a friction retard mechanism on the levers effective to initially resist separation of the levers during closing of the handles and jaws and to automatically release allowing the levers to separate.

22. In a hand stripper mechanism, a pair of pivoted levers, handles on the levers constructed to be manually closed and opened effective to pivot the levers open and closed, a spring for biasing the handles open and the levers closing at all times, pairs of clamping and stripping jaws on the levers effective to grasp and strip insulation from wire positioned between them, and a retard mechanism on the levers effective to automatically resist pivoting closure of the levers when the handles are released thereby allowing a wire to be removed from between the jaws prior to closing of the levers but constructed to be overcome by the spring prior to full handle separation to allow the levers to close.

23. The structure of claim 1 further characterized in that one of each pair of members is fixed on the levers and the other of each pair is slidably mounted thereon, and a connection between the slideable members and the handles such that manipulation of the handles in an opening and closing action will cause the clamping and stripping members to open and close.

24. The structure of claim 23 further characterized in that the handles are slideably mounted on the levers.

* * * * *